(12) United States Patent
Garth

(10) Patent No.: US 6,619,097 B1
(45) Date of Patent: Sep. 16, 2003

(54) MACHINE FOR STAMPING, BENDING AND/OR MOUNTING SHEET METAL PARTS

(76) Inventor: Harald Garth, Akams 1, 87509 Immenstadt (DE)

( * ) Notice: Subject to any disclaimer, the term of this patent is extended or adjusted under 35 U.S.C. 154(b) by 397 days.

(21) Appl. No.: 09/679,772

(22) Filed: Oct. 5, 2000

(51) Int. Cl.[7] .................... B21D 7/022; B21J 9/18
(52) U.S. Cl. ............... 72/384; 72/394; 72/403; 72/446; 72/447; 72/449; 72/452.7; 140/105
(58) Field of Search ............... 72/472, 449, 384, 72/446, 404, 452.7, 447; 140/105

(56) References Cited

U.S. PATENT DOCUMENTS

| | | | | |
|---|---|---|---|---|
| 3,052,277 A | * | 9/1962 | Stegmann | 72/380 |
| 4,580,329 A | * | 4/1986 | Bihler et al. | 72/449 |
| 4,581,917 A | * | 4/1986 | Moriyama et al. | 140/105 |
| 4,607,517 A | * | 8/1986 | Finzer et al. | 72/449 |
| 4,696,178 A | * | 9/1987 | Bihler et al. | 72/384 |
| 4,773,250 A | * | 9/1988 | Miyazaki | 72/403 |
| 4,862,717 A | * | 9/1989 | Dolliner | 72/447 |
| 5,301,410 A | * | 4/1994 | Finzer | 72/446 |
| 5,996,392 A | * | 12/1999 | Garth | 72/452.7 |

* cited by examiner

Primary Examiner—David B. Jones
(74) Attorney, Agent, or Firm—Notaro & Michalos P.C.

(57) ABSTRACT

The invention relates to a machine for stamping, bending and/or mounting of sheet metal parts with at least one upper housing part 14 and at least one lower housing part 16. Preferably, several are arranged in a row. On each housing part 14, 16 the carriage apparatus 20 is engaged by a motor. In order to increase the productivity of the machine, the carriage is driven by a program-controlled synchronous motor. In one embodiment a gear is positioned between motor and carriage which is formed preferably as an eccentric disc, connecting rod or elbow lever. The program-controlled synchronous motor is embodied as a torque motor and coupled by the gear member with the carriage.

13 Claims, 14 Drawing Sheets

MACHINE FOR STAMPING, BENDING AND/OR MOUNTING SHEET METAL PARTS

FIELD AND BACKGROUND OF THE INVENTION

The present invention relates to a machine for stamping, bending and/or mounting sheet metal parts, comprising a plurality of housing boxes which are vertically aligned and connected. Several housing boxes can be arranged in a row. Each housing box contains an upper housing part and optionally a lower housing part. The upper and lower housing parts are horizontally aligned and connected to each other in each housing box. Each housing part contains at least one carriage apparatus including a carriage guide, which engages a motor.

Moreover, the invention relates to a method for operating such a machine.

The present invention relates in general to an indexed advancing machining device in which a workpiece is subjected to stamping, bending, deepdrawing or other machining processes, wherein all machining processes are carried out by a cycled, indexed, stepwise advancement of the workpiece from one to the next processing step. The workpiece is thus subjected sequentially to a series of machining processes until the entire machining process is completed by the final process. The individual machining processes are carried out in a single system. Depending on the workpiece and the number of required process steps, a plurality of machines can be sequentially positioned in a modular arrangement according to EP 0 875 311. They are suitable especially for the mass production of sheet metal pieces because of their high production capacity, their short workpiece throughput times, and their high degree of automation.

EP-A 0 103 885 teaches a machine in which elongate upper and lower housing parts are connected to one another by spacing bodies at their ends to form a frame. At the front side and at the backside of each housing part, a number of carriage apparatus are fastened on which, in turn, corresponding tools are mounted for the workpiece to be produced, respectively. Worm gear shafts are provided in the housing parts and their end faces are flush with the housing parts. Several such housing frames can be connected to one another at their end faces wherein the connection of the drive shafts is realized by curved teeth couplings.

DE-A 195 35 949 teaches a machine in which housing parts extend between two vertical end beams, and the arrangement of several housing parts with their end face is not suggested.

EP-A 0 127 156 discloses a machine in which the housing comprises two horizontal supports and two vertical supports, wherein fixedly arranged torque output locations are provided in all four supports for coupling with a carriage apparatus.

DE-C 40 10 115 shows a machine for stamping, bending and mounting which, however, differs from the machine of the present invention in that the housing is used with closed front plates, wherein a central wheel is supported in the housing and a plurality of star-shape arranged carriage apparatuses are in driving engagement with the circumference of the wheel. Several such machine housings can be sequentially arranged in a modular fashion. The synchronization of the central wheels in all individual machine housings and, even more, of their starshape arranged and radially operating carriage apparatus is a problem because of the required angular gears and couplings.

The number of sequentially performed bending processes differs depending on the type of the product to be produced. Often, the bending device has a stamping device upstream; in some situations, however, the latter is not needed. The known machines are too large for simple bending parts because they are designed for eight or more carriage apparatuses or a multiple thereof. Even when all positions are not occupied by carriage apparatuses, angular gears that are not required, are running so that energy consumption and wear are unnecessarily high.

DE 195 36 036 teaches connecting individual machining units to a crankshaft drive so that the individual bending stamps can be activated or deactivated as selected. This is achieved by a piston cylinder arrangement which is moved by pressure medium actuation as a unit by the crankshaft so that the apparatus becomes active. By venting the cylinder, the apparatus is deactivated and the piston runs without load in the cylinder in a reciprocating fashion.

In EP 0 875 311 a system is described in which the stations are switched on and off as selected by engageable and disengageable bevel gears. These bevel gears are mounted on a spline shaft penetrating the machining units, wherein the energy and the movement of the individual machining units is delivered by a common drive motor to the individual machining units via the aforementioned shaft. The common drive shaft ensures that all machining units operate synchronously to one another and synchronously to the advancing cycle of the workpiece to be machined. If it is desired to produce a new workpiece on such a system of machining units, not only must the individual tools be exchanged and optionally individual stations be switched on or off, but also the respective tool stroke must be adjusted to the exchange of the eccentric apparatus. This requires an exchange of the eccentric discs which move the carriage apparatus. The eccentric discs also determine the carriage stroke because of their eccentricity. After the eccentric discs are exchanged, their angle adjustment must also be corrected so that the machining units move in a precisely timed manner with the advancement of the workpiece. Retooling times of four to six hours are required for such a tool exchange and adjustment of the machine to a workpiece that is to be newly produced. The cooperation of the workpiece advancement and the machining units must be precisely adjusted to each other with respect to timing and may not change even for working cycles of, for example, 500 strokes per minute. Due to the high cycle frequency for strokes of typically 40 to 50 mm, the machining units must not only receive considerable cutting forces but also considerable acceleration forces. Upon running in the machine, it is desirable that the stations can be operated individually, and a common reference position must be adjustable in a reproducible manner.

SUMMARY OF THE INVENTION

It is an object of the present invention to increase the productivity of a machine for stamping, bending, and/or mounting of sheet metal parts, and especially, to reduce the required retooling times for the adjustment of the eccentric discs.

A carriage apparatus is driven by a program-controlled synchronous motor. The movement cycle of the synchronous motor can be programmed. Instead of using an eccentric disc, the stroke can be adjusted easily by a program change. An exchange of eccentric discs is not required. Accordingly, the retooling time is advantageously reduced.

Because the controlling torque of the synchronous motor is exceeded due to high frequency and partially high shaping forces, it is advantageous for a gear, such as an eccentric disc, connecting rod, or elbow lever, to be positioned between the motor and carriage apparatus. High processing forces can be generated without the need for a large synchronous motor due to the corresponding gear reduction.

In connection with rotary gears such as eccentric discs, it is especially advantageous when the program-controlled synchronous motor is a rotation motor, preferably a torque motor, which is coupled to the carriage apparatus via the gear membrane. The stroke can be easily changed because the synchronous motor is operated only over a portion of its range. This means that the drive only employs a minimal angular range of the eccentric disc. This reduces the stroke. Accordingly, there is no need for a new eccentric disc. Neither an exchange of the eccentric disc is required during retooling nor the critical adjustment of the angular position for synchronization of the process steps. For both the running of the machine and the individual stations, respectively, the individual synchronous motor of the station can be controlled separately which facilitates control during retooling considerably. In this manner, individual stations can also be switched on or off as desired without having to mechanically intervene in the energy flow. This means that gear members such as movable clutches and angular gears are not needed.

In a further embodiment the motors of several sequentially arranged housing parts are exchangeable with one another. With such a standardized interface between the motors and the housing parts, the individual machine can be constructed very flexibly. Not only can individual stations be switched on and off electronically in a simple manner, but an excess number of motors can also be avoided, and they can be used in other machines or at other locations. The employed synchronous motors have an especially high output with a small volume when the motor is water-cooled. The resulting heat loss can thus be directly dissipated away from the machine. Problems with non-uniform heating of the machine are advantageously prevented. The machine maintains its precision even over extended production periods.

The individual housing parts can be sequentially arranged despite the water-cooled motors in a convenient, quick, and easy way when the housing parts have a cooling water inlet and cooling water return lines for the motors correlated therewith which are adjusted relative to one another in regard to their position. When connected sequentially, the individual housing parts form a common cooling water inlet and return line. These lines can be connected to one another, for example, by quick couplings.

In another embodiment the machine of the present invention comprises a memory-programmable control which comprises a current measuring device and an evaluation circuit which produces a signal as soon as set point limit values of a working cycle current are surpassed or no longer reached. As soon as a tool begins to turn dull, the required cutting and bending forces increase so that the current uptake of the motor also increases. Upon surpassing a predetermined limit value, the machine can thus be shut down and preventive servicing of the tool can be performed. Thus, the machine will not accidentally produce rejects. The same holds true when falling below a predetermined limit value, for example, due to tool breakage. When tool breakage occurs, the machine can also be shut down and a tool exchange can be carried out.

Also, the machine, upon surpassing or falling below the limit value, automatically will shut down. In this way, the machine will not accidentally produce rejects. As soon as tool breakage or tool wear occurs, which could lead to intolerable changes on the workpiece, the machine will automatically shut down.

The machine has a standardized and modular composition because the upper and the lower housing parts are components of a uniform narrow housing box whose front side has correlated therewith not more than one upper and one lower carriage apparatus. Such housing parts can be variably arranged in sequence and adjusted to the respective tool.

In certain situations it is advantageous where the torque motor has a continuous shaft which is provided with output hubs at both ends. For example, this allows symmetrical force introduction into a press by means of an elbow lever. Moreover, rear and front housing parts with their carriage apparatus can be driven by a common torque motor because the torque motor has two output shaft ends.

According to a further embodiment of the invention, the carriage apparatus is provided with eccentric discs which project past the narrow housing boxes such that between two neighboring housing boxes an optionally two-part spacer block is connected by screwing. This increases the spacing of the output shafts of neighboring housing boxes so that carriage strokes of 50 mm and more can be performed. Such simple intermediately positioned spacer blocks also allow a precise grid length and cutting length adjustment which may be required because of shaping of the workpieces during machining.

The machine according to a further embodiment has a front and rear housing box row wherein each front housing box is connected to a rear housing box at the top and bottom via a connecting plate and screws. As an alternative, connecting plates extending over the entire length of the housing box row can be provided. Both housing box rows have their own drive motors.

It is also advantageous to eliminate several drive motors for the individual carriage apparatus when a gear is connected between the motor and carriage apparatus and the gear is formed as a central wheel with pinions. The carriage apparatus is engaged with and driven by the gear wheel. A correspondingly stronger torque motor drives a larger central gear wheel. The pinions engage this central gear wheel and, in turn, drive the carriage apparatus whose axes are arranged radially to the axis of the central wheel. In this way, several carriage apparatuses can be driven simultaneously by a central wheel and the number of required individual drives is advantageously reduced.

The retooling time can be further reduced because the carriage apparatus is designed as a component group with the motor.

Moreover, it is an object of the invention to provide a method for operating the machine of the present invention while avoiding complicated exchange of eccentric discs.

The object in regard to the method is solved in that the rotation motor can be reversibly operated over only a selected angular range. Depending on the size of the angular range which is used, the stroke that is generated will change for the same eccentric disc. An exchange of the eccentric disc for the purpose of stroke change can therefore advantageously be eliminated.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which a preferred embodiment of the invention is illustrated.

DESCRIPTION OF THE PREFERRED EMBODIMENTS

Figure 1:
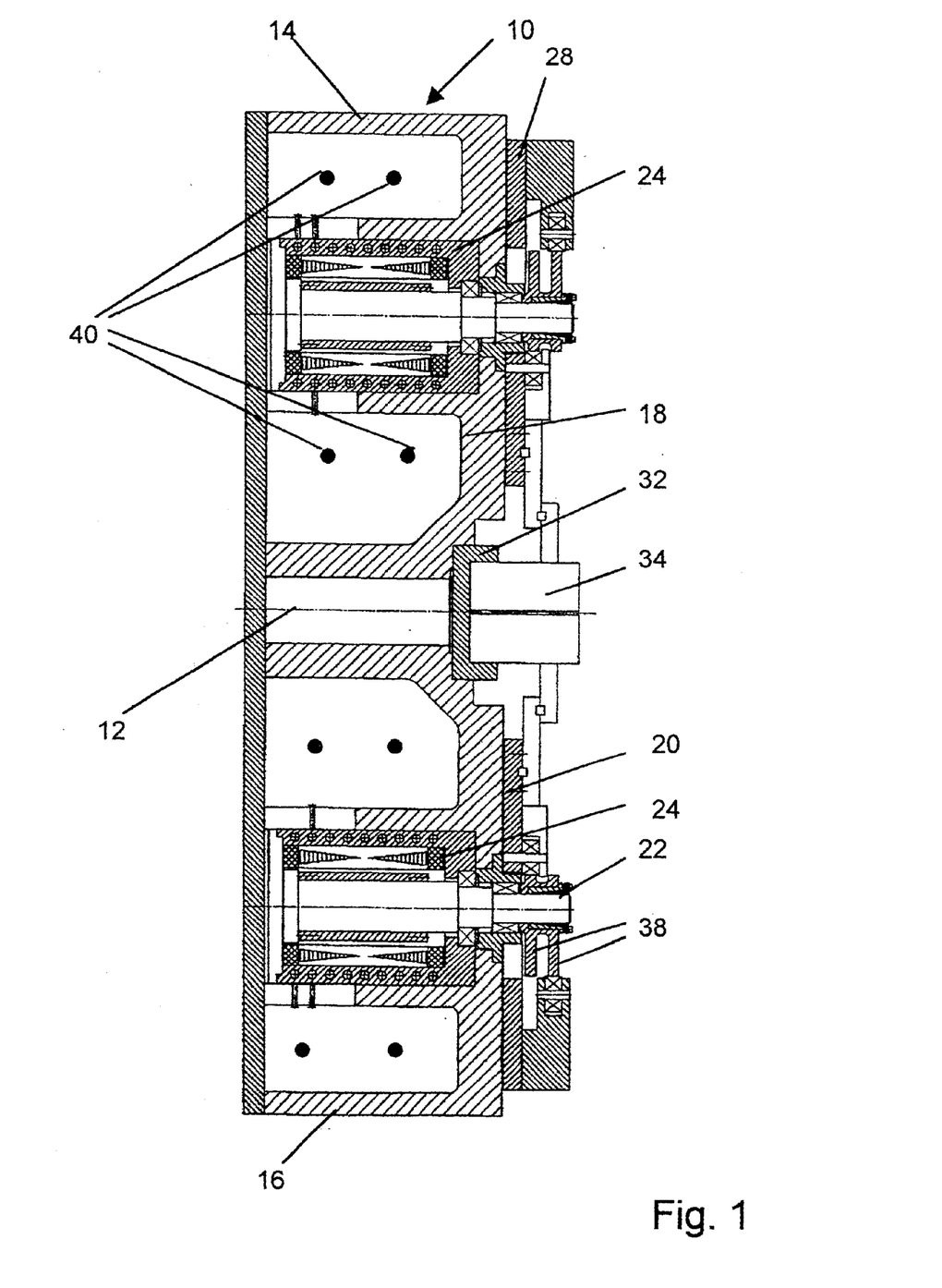
FIG. 1 is a central vertical section of a housing box with torque motors.

Referring now to the drawings, in which like reference numerals are used to refer to the same or similar elements, FIG. 1 shows a preferred embodiment of the present invention. A housing box 10 is mirror-symmetrical to a central horizontal plane 12 and has an upper housing part 14 and a lower housing part 16 which are both connected to one another to form a single part. The housing box 10 is cost-efficiently produced from a block of steel casting, ferro casting or a light metal casting, and, in particular, after surface machining of the bottom surface, is highly precisely milled in a clamped position. In this connection, a front wall 18 is machined such that parts of a carriage apparatus 20 can be correlated with the housing box 10. The carriage guides 28 in the form of guide strips for the carriage are connected to the front wall 18 of each housing box 10 in a positive locking way and are screwed thereto. Also, in the area of the central horizontal symmetry plane a tool receiving surface 30 is milled which serves for a positive-locking receiving of a tool base plate 32 of a tool 34 wherein also the tool base plate 32 can be screwed onto the front wall 18. In the embodiment according to FIGS. 1 through 6, an upper and a lower motor housing, which contains the torque motor 24, respectively, is inserted into each housing box 10. The housing boxes 10 are sufficiently wide so that the eccentric discs 38 mounted on the output shafts 22 of neighboring housing boxes 10 do not touch one another. The eccentric discs 38 for a carriage stroke of 40 mm result constructively in a minimal width of the housing boxes 10 of 176 mm. Larger eccentric discs, for example, for a carriage stroke of 50 mm, will result in a housing box width of approximately 200 mm.

Figure 2:
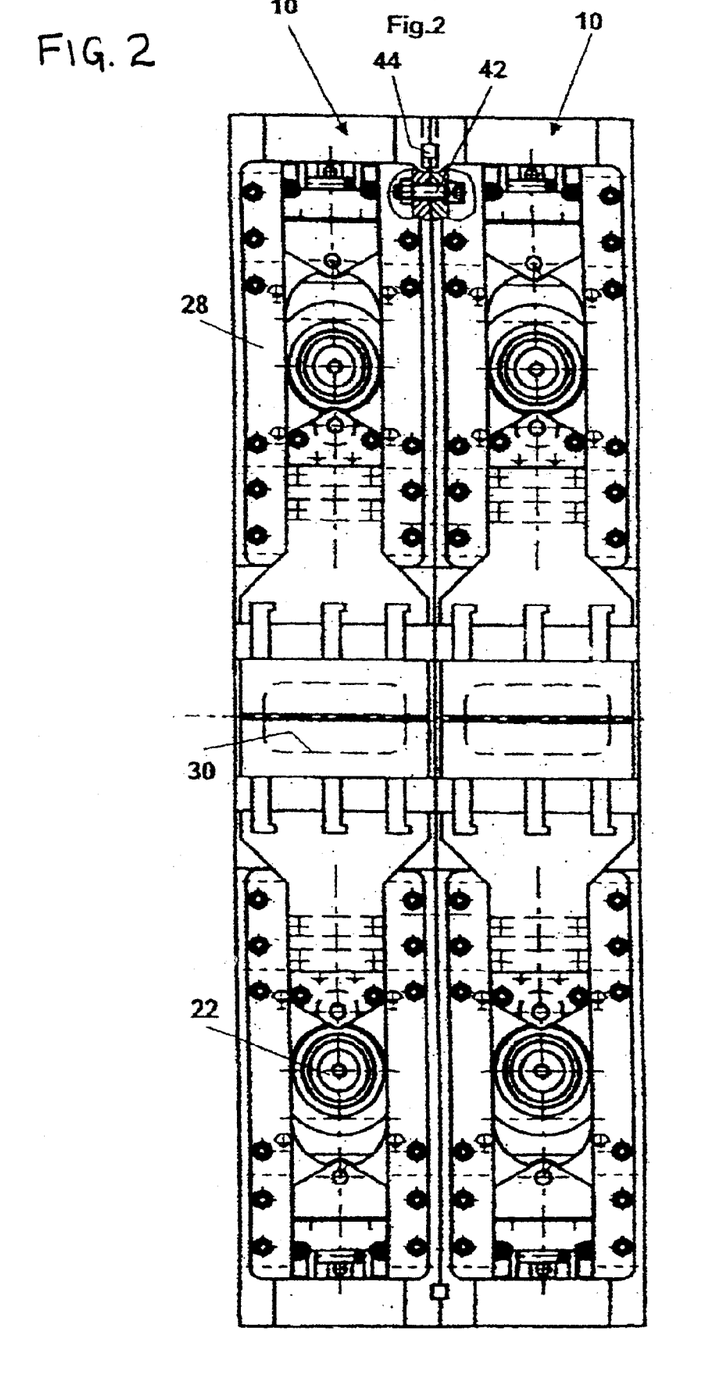
FIG. 2 is a front view of two housing boxes screwed to one another.

Bores 40 are provided in the sidewalls of the housing boxes 10 so that neighboring housing boxes 10 can be screwed to one another easily. This is achieved by machine screws 42 as illustrated in FIG. 2. Feather keys 44 provide exact guiding in the external grooves of the housing boxes 10.

Figure 3:
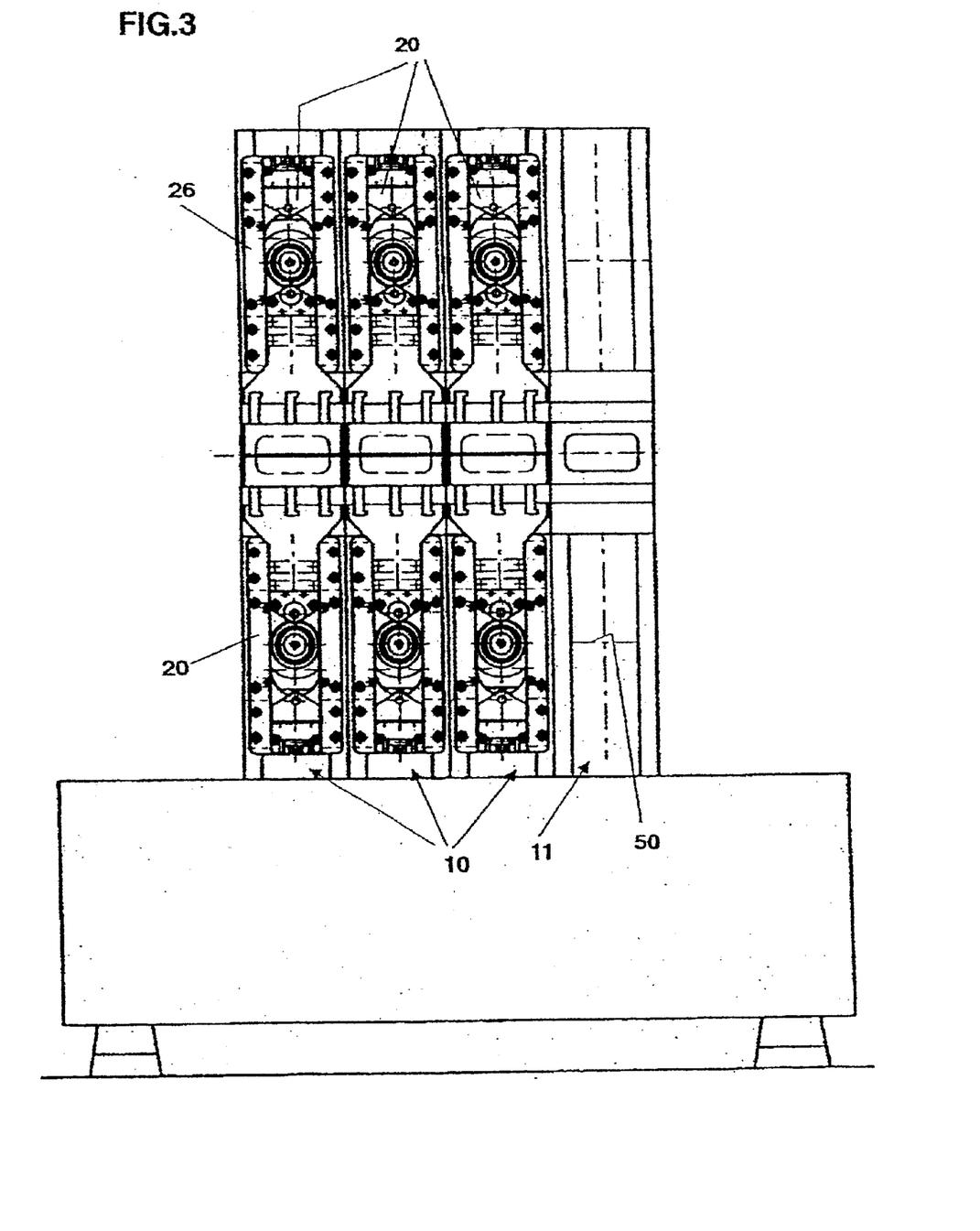
FIG. 3 is a front view of three housing boxes screwed to one another and of a spacer block.

FIG. 3 illustrates a first embodiment of a sheet metal machining and mounting machine with four housing boxes screwed together wherein three housing boxes 10 are furnished with carriage apparatuses and a further housing box 11 is provided which is screwed onto the end. Drive distribution boxes would normally be required at the ends, but can be eliminated due to the use of torque motors. In the prior art such drive distribution boxes are required so that the upper and lower drive shafts can be connected to one another in driving connection. In the prior art, angular gears are provided in the drive boxes which are driven by an electric motor, which in this case is also required because each carriage apparatus must be driven by its own torque motor. The drive shafts, which in the prior art drivingly connect bending devices for common driving with a single motor and which in the present invention would otherwise extend along the geometric axis 50 to be pushed through the angular gears, can also be eliminated.

Figure 4:
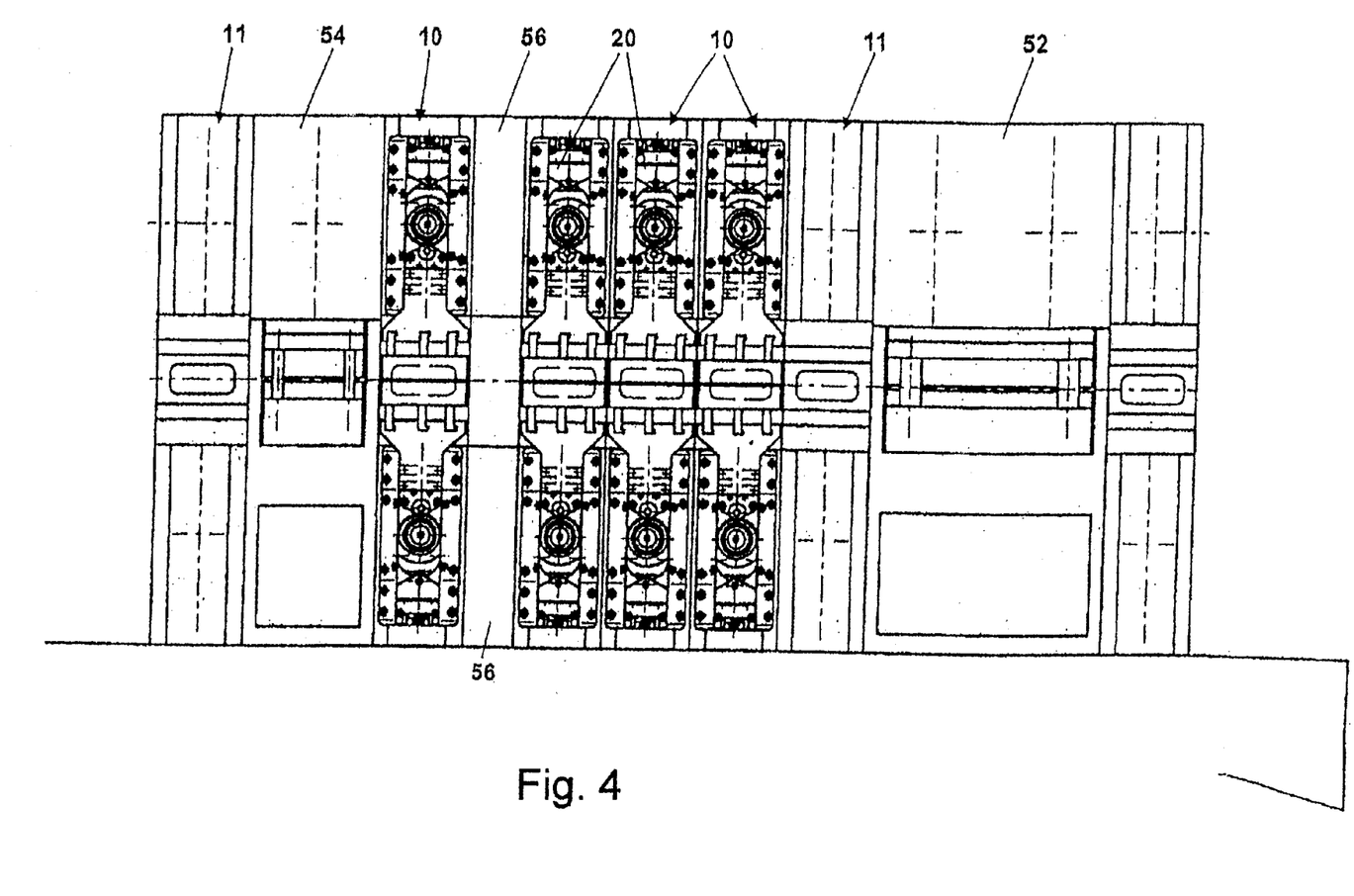
FIG. 4 is a front view of a machine with two presses and four housing boxes as bending devices.

FIG. 4 illustrates a larger machining apparatus which is comprised of the same basic units, i.e., the housing boxes 10 and 11. In addition, two stamping presses 52, 54 are integrated into the modular system. The assembled complete housing can still go without the otherwise provided motor drives at the ends.

Spacer blocks 56 are arranged between two housing boxes 10. The spacer blocks 56 permit the use of larger eccentric discs for the carriage apparatus of the housing boxes 10 illustrated to the left. Moreover, such spacer blocks 56 can change the grid and cutting lengths according to the workpieces to be shaped.

Figure 5:
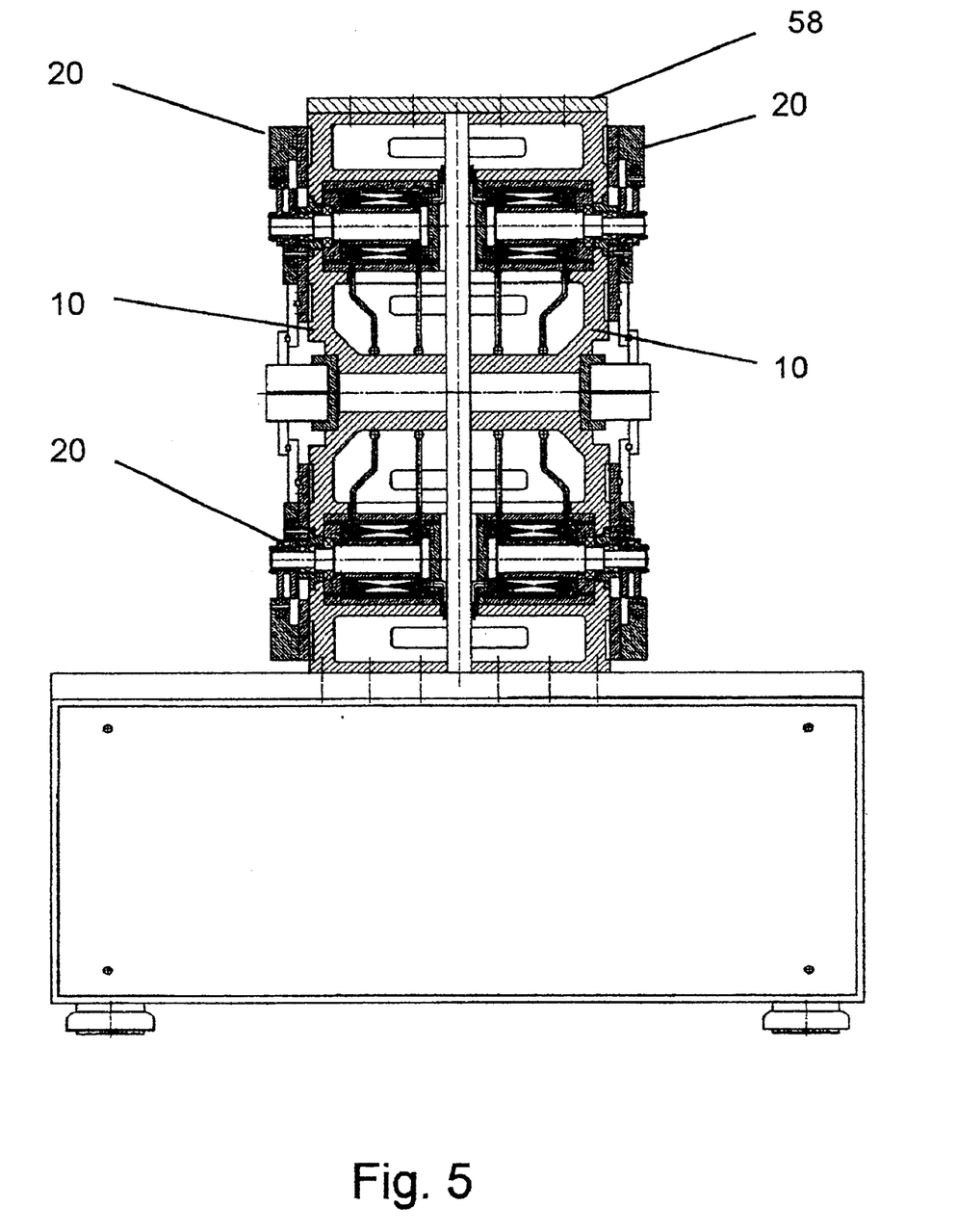
FIG. 5 is a vertical section of several front and rear housing boxes.
Figure 6:
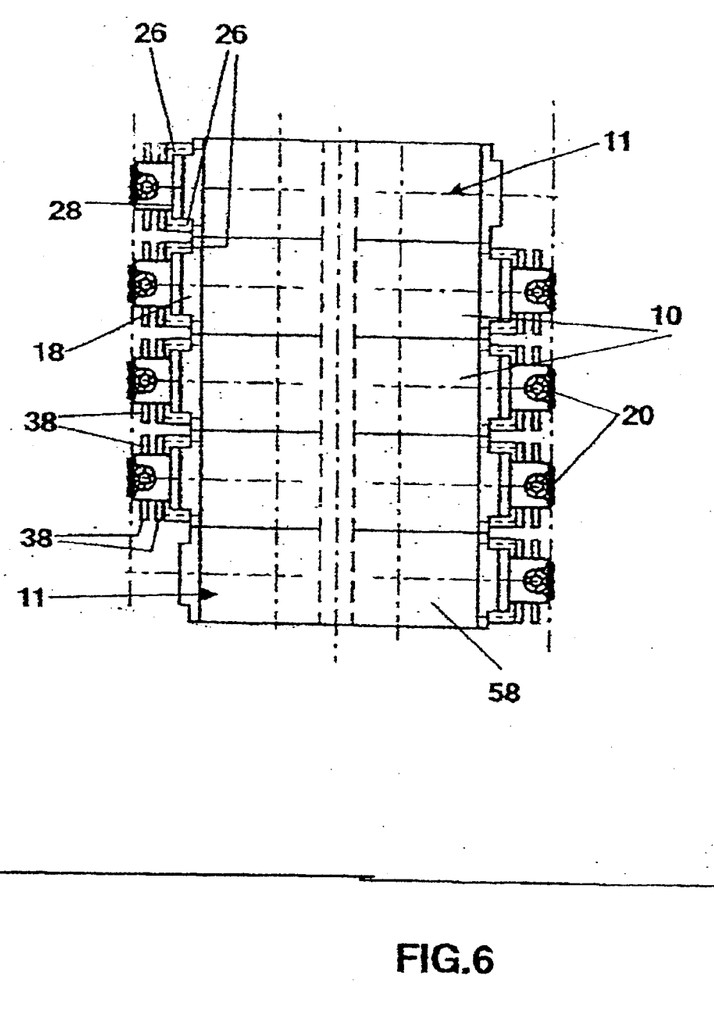
FIG. 6 is a plan view onto a machine similar to FIG. 5 with four housing boxes as bending devices, respectively.

FIG. 5 shows a vertical sectional view of a twin housing which is comprised of a front row of housing boxes 10 and a rear row of housing boxes 10 wherein the bottom wall of the housing boxes of both rows is screwed onto the sub structure, while at the top both housing box rows are connected to one another by a connecting plate 58 and screws. The formed housing supports carriage apparatus 20 on the front side and on the rear side. According to FIGS. 5 and 6, the connecting plate 58 extends across both housing box rows. As an alternative, each pair of front and rear housing boxes 10 can be provided with its own correspondingly narrow connecting plate.

Figure 7:
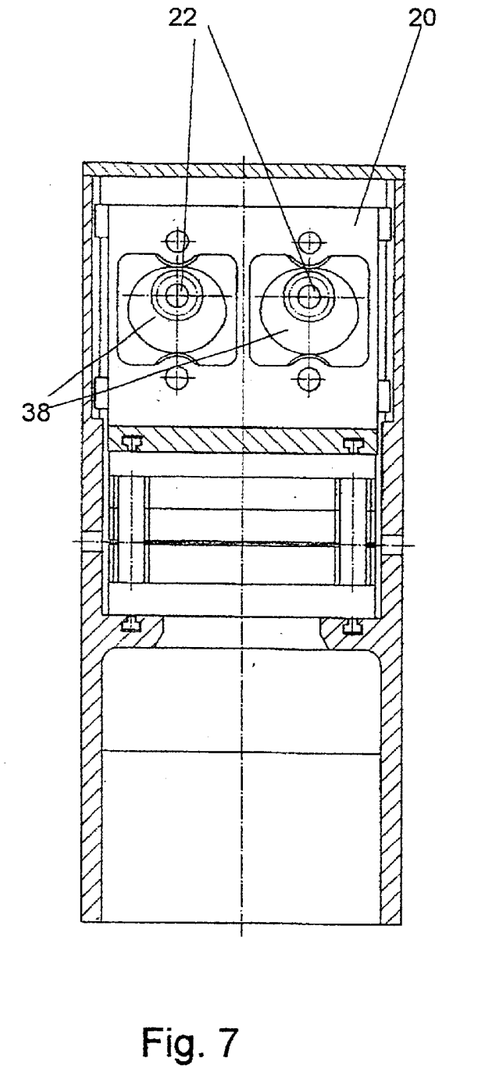
FIG. 7 is a view of a housing box with twice the width and two drives.

FIG. 7 shows a housing box of double width for a stamping press. The carriage apparatus 20 is driven by two output shafts 22 of two torque motors. On the output shafts 22, two eccentric discs are seated which drive the carriage apparatus 20.

Figure 8:
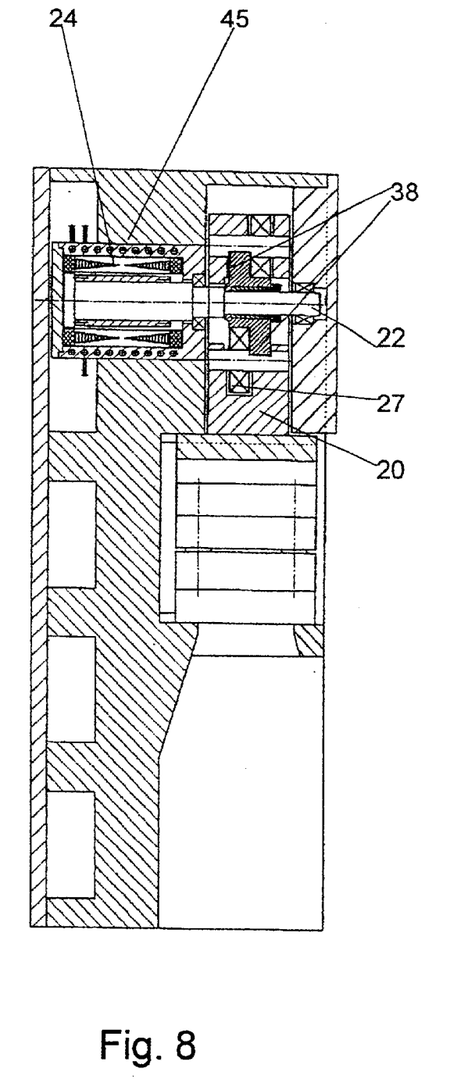
FIG. 8 is a vertical sectional view of the double wide housing box according to FIG. 7.

FIG. 8 illustrates in vertical section a similar embodiment as FIG. 7. On the output shaft 22 of the torque motor 24, two sensing rollers 27 of the carriage apparatus 20 glide on a double eccentric disc 38.

Figure 9:
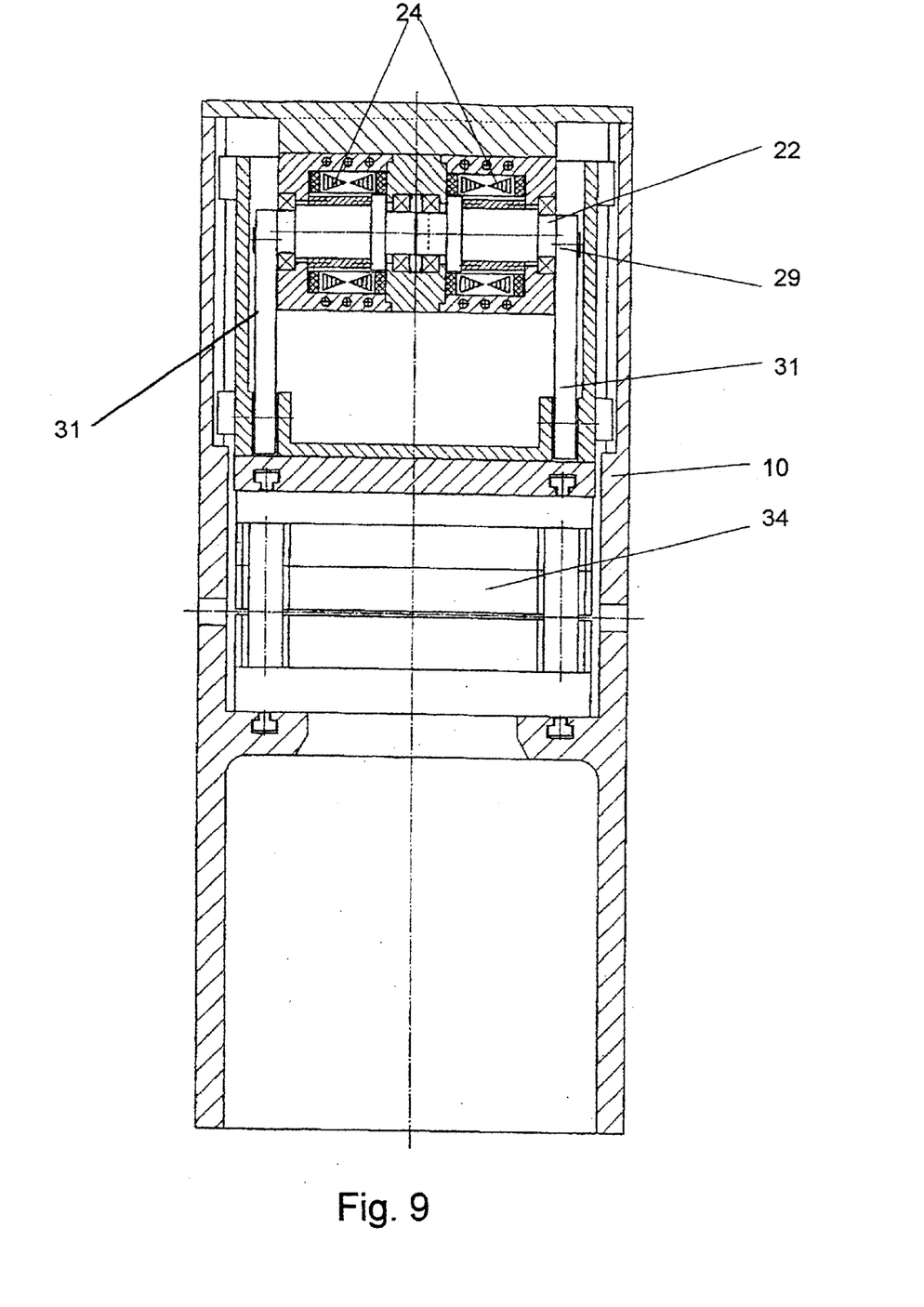
FIG. 9 is a vertical section of the double wide housing boxes with two symmetrically arranged torque drives.

FIG. 9 shows a different arrangement of a press in which two torque motors are aligned axially in the housing box 10. The connecting rod 31 is moved by means of an eccentric 29 which is arranged on the output shaft 22, so that the tool 34 carries out a corresponding stroke.

Figure 10:
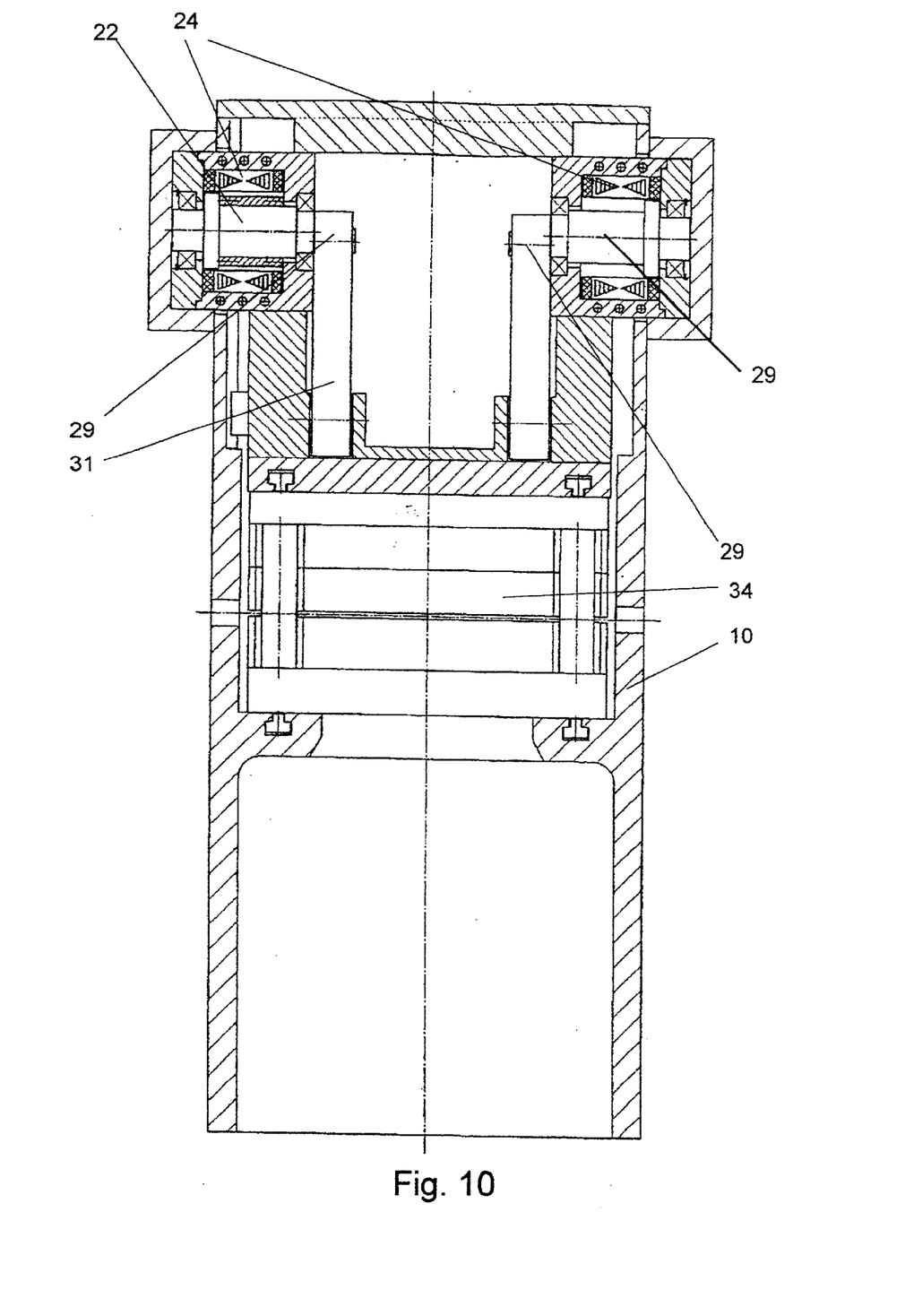
FIG. 10 is a press according to FIG. 9 with different arrangement of the drives.

FIG. 10 shows an alternative arrangement of two torque motors for driving a press. In this arrangement, the drive is realized by the drive shaft 22 acting on the eccentric 29. The latter drives the tool 34 by means of a connecting rod 31.

Figure 11:
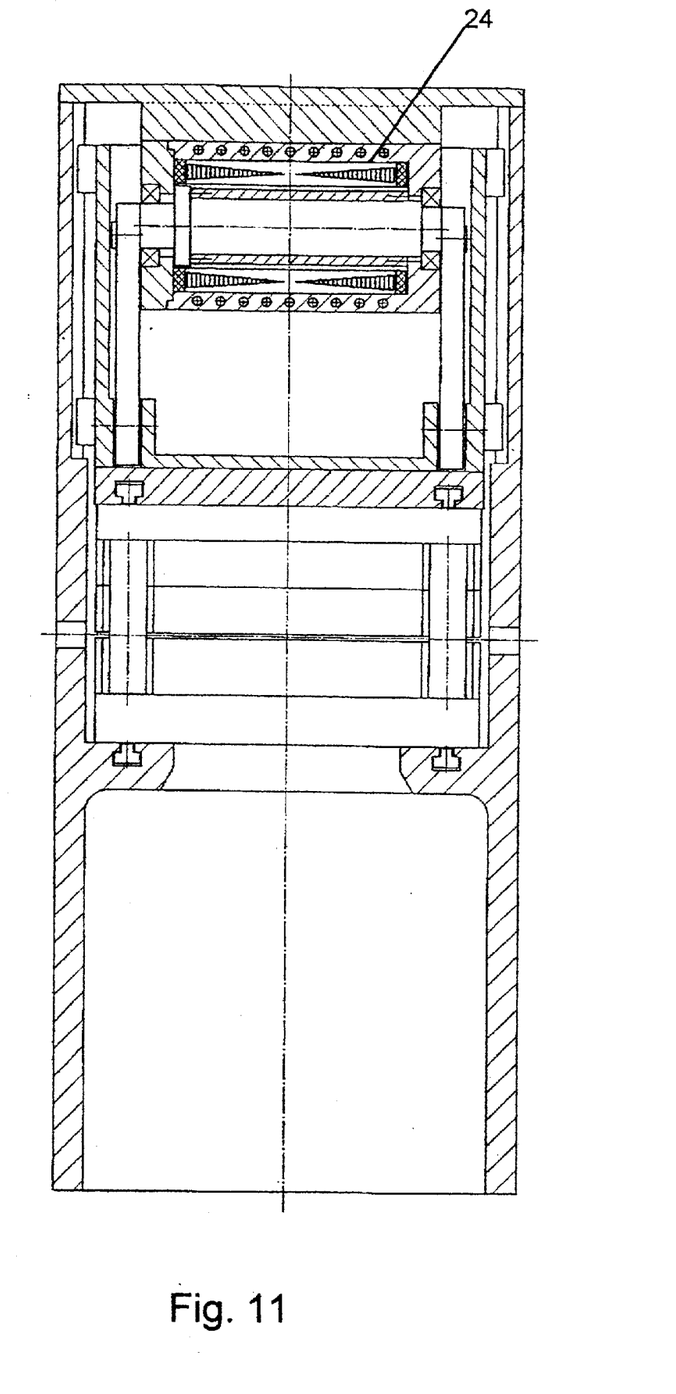
FIG. 11 is a press according to FIGS. 9 and 10 but with a single drive with two symmetrically arranged output shaft ends.

FIG. 11 shows a principally similar type of drive. However, a torque motor is shown which has output shafts in the interior on both sides, which drive the connecting rod by means of the eccentric.

In all cases the torque motors have an identically designed housing whose housing mantle is cooled at the inner side by a cooling channel 25. The motors themselves are round and have in addition a torque support for supporting them on the housing box 10.

Figure 12:
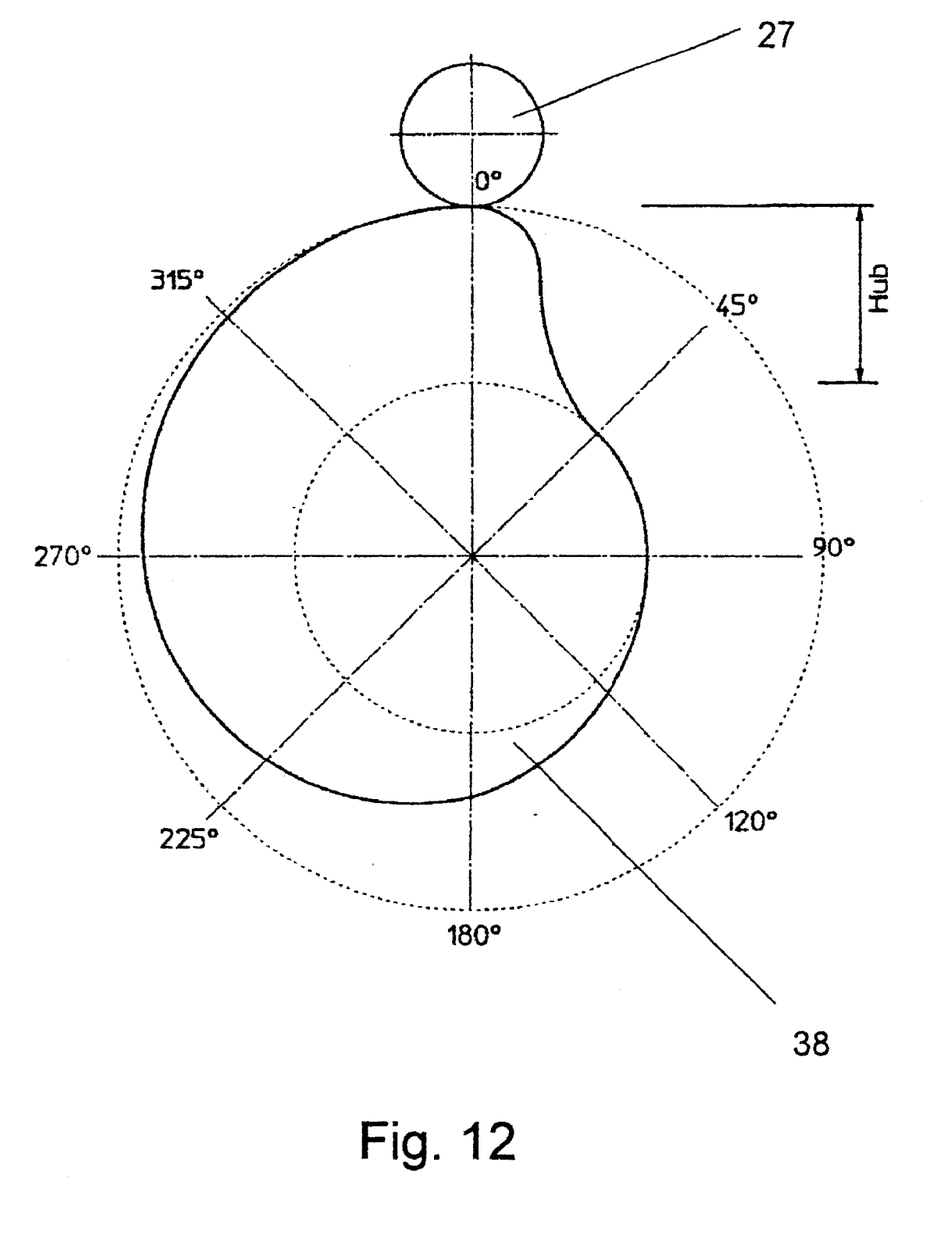
FIG. 12 is a front view of an eccentric disc.

FIG. 12 shows an eccentric disc whose outer contour is followed by the sensing roller 27. The sensing roller 27 is conventionally connected to the carriage apparatus. When the eccentric disc 38 is rotated for example between 0° and 45°, it performs a maximum stroke. The same holds true when it is rotated, for example, in the clockwise direction from 0° to 45° wherein it passes through an angular range of 315°. The transmission of the rotational movement is different, depending on which angular range is used for operating the eccentric disc. The advantage of the torque motor is that the rotation of the eccentric disc can be pre-programmed. The torque motor can also be carried out in a reversing direction over a portion of the angular range so that only partial strokes can be performed.

Figure 13:
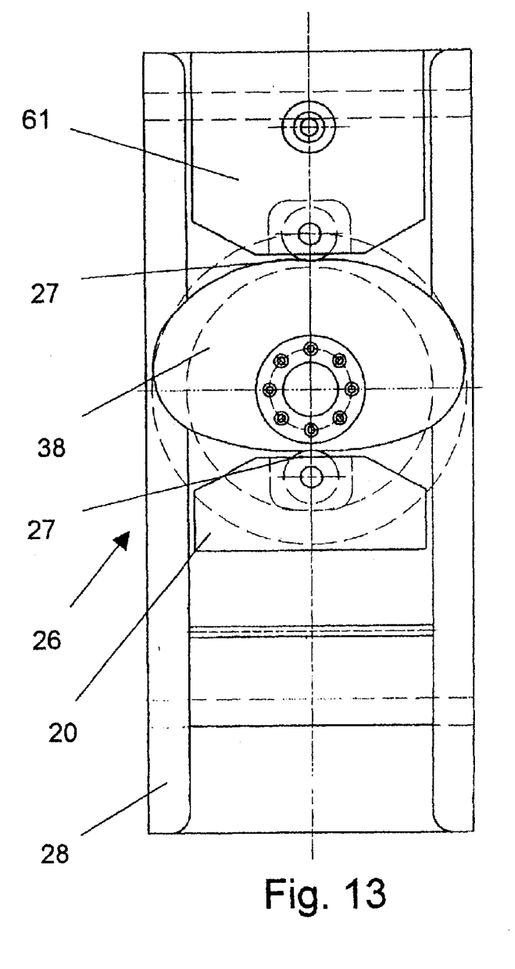
FIG. 13 is a front view of an individual carriage apparatus.
Figure 14:
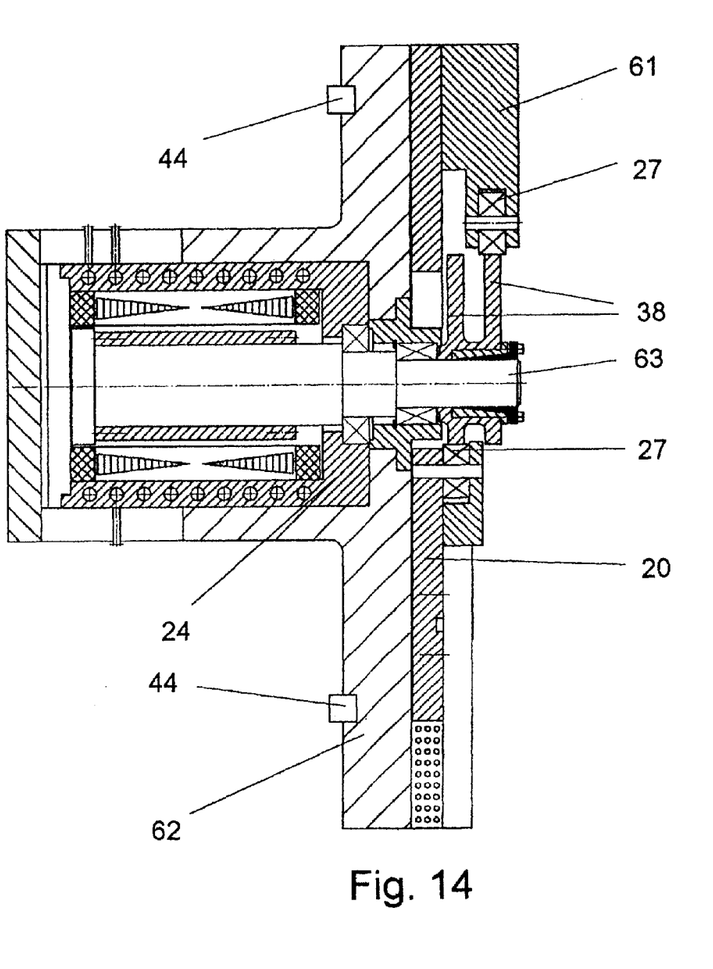
FIG. 14 is a vertical cross sectional view of the individual carriage apparatus according to section line XIV—XIV of FIG. 13.

In FIG. 13 the front view of an individual carriage apparatus 26 is shown. Parts with identical function are provided with the same reference numerals as in the other figures. In contrast to the carriage apparatus as illustrated in FIG. 1, FIG. 14 shows a vertical sectional view of an individual carriage apparatus in which the carriage 20 is mounted within the guide 28 on an adaptor plate 62. The adaptor plate 62 is at the same time formed as a housing for the torque motor 24. In this way, the adaptor plate 62 can be fastened as a component group, which also integrates the torque motor 24, by means of feather keys 44 on the front side of a housing part. This component group comprises all required drive parts of the carriage 20. The torque motor 24 drives the two eccentric discs 38 by its output shaft. A lower sensing roller 27 whose axle is fixedly connected with the carriage 20, drives the carriage in the workpiece direction. The upper roller 27 whose axle is fixedly connected with the return plate 61, which is, in turn, fixedly connected to the carriage 20, returns the carriage after it has performed a machining step.

Figure 15:
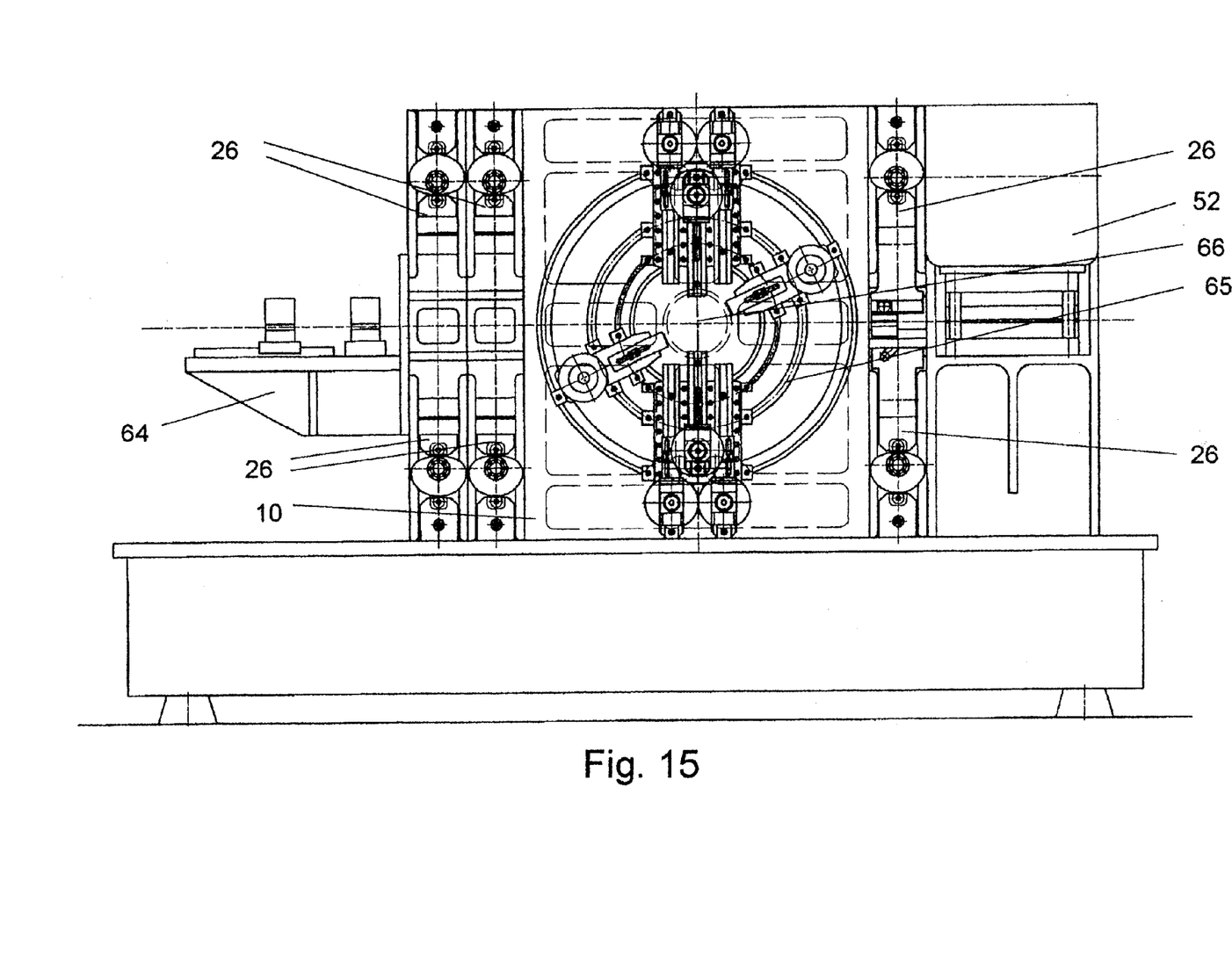
FIG. 15 is a front view of a machine with two housing boxes with linearly driven carriage apparatus, a central wheel with several carriage apparatus in a different embodiment, and a press.

In FIG. 15 several such linearly driven individual carriage apparatuses are illustrated which can be screwed onto the housing boxes as component groups. A linear intake 64 for material is provided on the left side of the illustrated machine. Toward the right, two upper and two lower linearly driven carriage apparatuses 26 follow. Downstream thereof, a housing box 10 with central wheel 65 is positioned. The station comprises a total of eight carriage apparatuses driven by the central wheel 65. Three of the carriage apparatuses are respectively positioned in the vertical direction, above and below the central wheel axle 66, and in addition, one is positioned to the right and one to the left, with an axle which is slanted relative to the horizontal.

Figure 16:
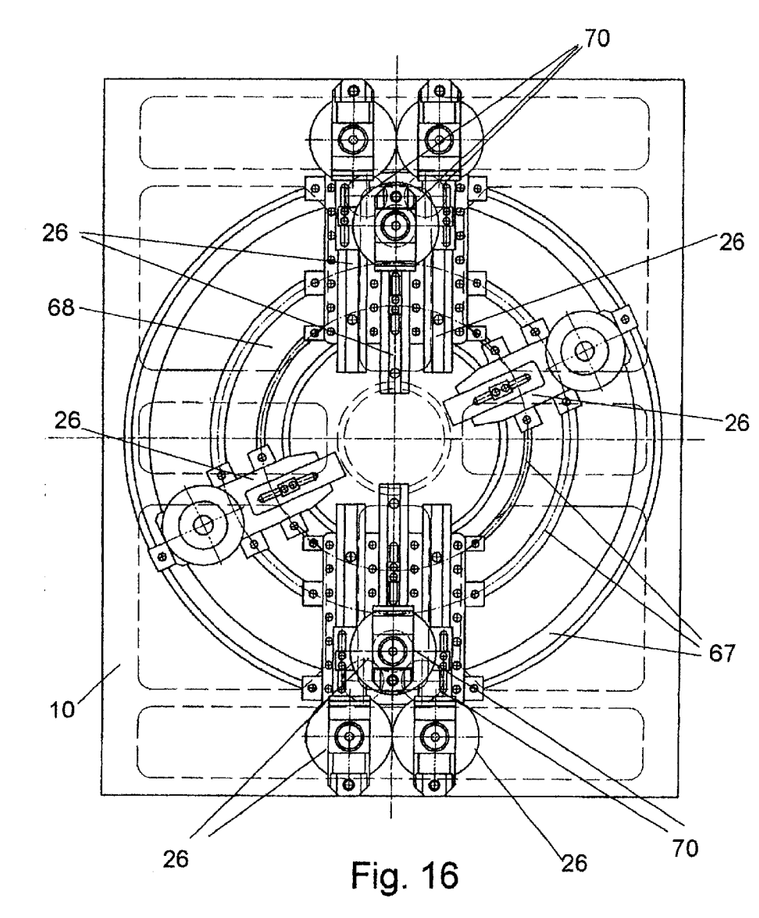
FIG. 16 is a front view of a housing box with central wheel.
Figure 17:
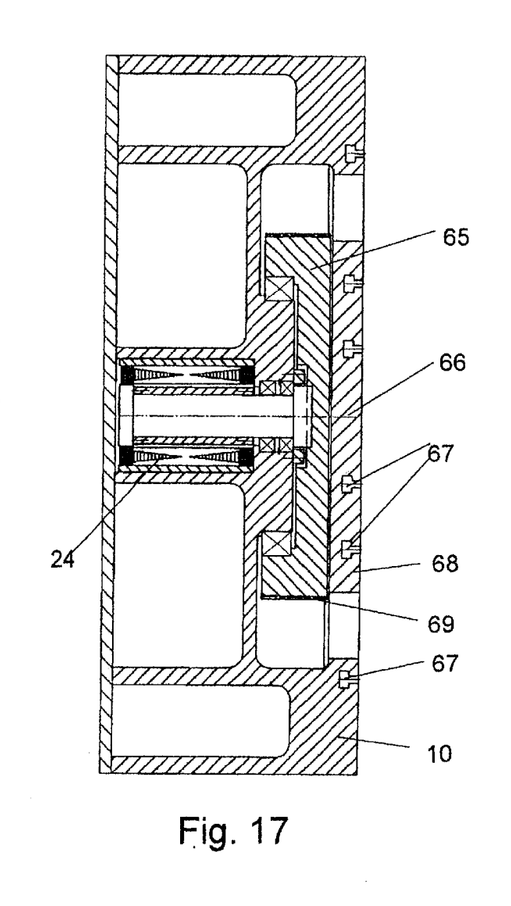
FIG. 17 is a vertical sectional view of the central wheel according to section line XVII—XVII in FIG. 16.

To the right, upper and a lower housing parts 14 and 16 are provided with further carriage apparatus 26. The machine ends with a stamping press 52. The construction of the station with a central wheel drive can be seen in particular in FIGS. 16 and 17. In FIG. 17, the carriage apparatuses are not illustrated in order to simplify the drawing. In the housing box 10, a single torque motor 24 is provided as a drive for the carriage apparatus 26. The movement axes of these carriage apparatuses 26 are arranged radially relative to the central wheel axle 66. Accordingly, the carriage apparatuses 26 are fastened with hammer head screws (not represented) engaging annular grooves 67 on a central clamping plate 68. The clamping plate 68 is part of the housing box 10. Behind this clamping plate, the outer toothing 69 of central wheel 65 is engaged by a pinion 70 which drives the carriage apparatus 26. In this way, the eight carriage apparatuses of the embodiment can be driven by a single torque motor which reduces the capital expenditure for the drive motors significantly.

The machine according to the invention for bending, stamping etc. is characterized in that drive shafts penetrating the housing parts, which are to be coupled to angular gears in each housing part, can advantageously be eliminated. Due to the minimal mass of the employed motors, the machine hardly coasts when shut down. Moreover, the bending and stamping force can be continuously measured during a working cycle for quality control. The individual stations can be switched on and off as desired without having to initiate complicated retooling work.

While a specific embodiment of the invention has been shown and described in detail to illustrate the application of the principles of the invention, it will be understood that the invention may be embodied otherwise without departing from such principles.

LIST OF REFERENCE NUMERALS 10 housing box
11 housing box, drive distribution box
12 horizontal plane
14 upper housing parts
16 lower housing parts
20 carriage apparatus
22 drive shafts
24 torque motor
26 carriage apparatus
27 sensing rollers
28 carriage guides
29 eccentric
30 tool receiving surface
31 connecting rod
32 tool base plate
34 tools
38 eccentric discs
40 bores
42 machine screws
44 feather keys
45 cooling channels
46 angular gears
48 electric motor
50 geometric axis
52 stamping press
54 stamping press
56 spacer blocks
58 connecting plate
60 bearing ring
61 return plate
62 adaptor plate
63 output axle
64 linear intake 65 central wheel
66 central wheel axle
67 annular grooves
68 clamping plate
69 outer toothing
70 pinion
71 component group

What is claimed is:

1. A machine for stamping, bending and/or mounting sheet metal parts, comprising:
   - a first housing box with top and bottom ends, having an upper housing part at the top end and a lower housing part at the bottom end, horizontally aligned and connected to one another;
   - a second housing box, having an upper housing part and a lower housing part horizontally aligned and connected to one another, wherein said second housing box is vertically aligned and connected to said first housing box;
   - at least one program-controlled torque motor contained within each of the upper and lower housing parts; and
   - at least one carriage apparatus with a carriage guide contained within each of the upper and lower housing parts, wherein each carriage apparatus engages the torque motor.

2. The machine according to claim 1, further comprising a gear positioned between the motor and the carriage apparatus in each of the upper and lower housing parts.

3. The machine according to claim 2, wherein the gear is an eccentric disc, connecting rod or elbow lever.

4. The machine according to claim 1, wherein the motors in each of the upper and lower housing parts are interchangeable with one another.

5. The machine according to claim 1, wherein the motor is water cooled.

6. The machine according to claim 5, wherein said upper and lower housing parts have cooling water inlet lines and cooling water return lines for the motor, which are aligned with one another and form a common cooling water inlet and return line when the housing parts are arranged sequentially.

7. The machine according to claim 1, further comprising a memory-programmable control which comprises a current measuring device and an evaluation circuit which produces a signal as soon as set point limit values of current are surpassed or no longer reached during a working cycle.

8. The machine according to claim 7, wherein said machine shuts off automatically when surpassing or falling below a limit value.

9. The machine according to claim 1, wherein a two-part spacer block (56) is connected between said first and second housing boxes.

10. The machine according to claim 1, further comprising a third housing box with top and bottom ends in front of said first housing box, wherein said third housing box and said first housing box are connected to one another by a connecting plate at the top and bottom ends of each housing box.

11. The machine according to claim 1, wherein the torque motor has a continuous shaft provided at two ends with output shaft ends (22).

12. The machine according to claim 1, further comprising a central wheel (65) with drive pinions (70), positioned between the motor (24) and the carriage apparatus (26).

13. The machine according to claim 1, wherein the torque motor is operated reversibly about a selected angular range.

* * * * *